(12) United States Patent
Doona et al.

(10) Patent No.: US 9,517,934 B2
(45) Date of Patent: Dec. 13, 2016

(54) PROCESS FOR THE GENERATION OF CHLORINE DIOXIDE

(71) Applicant: The United States of America as Represented by the Secretary of the Army, Washington, DC (US)

(72) Inventors: Christopher J. Doona, Natick, MA (US); Kenneth Kustin, San Diego, CA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 122 days.

(21) Appl. No.: 14/201,964

(22) Filed: Mar. 10, 2014

(65) Prior Publication Data

US 2016/0068393 A1    Mar. 10, 2016

Related U.S. Application Data

(60) Provisional application No. 61/781,313, filed on Mar. 14, 2013.

(51) Int. Cl.
*C01B 11/02*    (2006.01)

(52) U.S. Cl.
CPC ................... *C01B 11/024* (2013.01)

(58) Field of Classification Search
CPC .................................................. C01B 11/024
USPC ............................................... 423/477, 478
See application file for complete search history.

(56) References Cited

U.S. PATENT DOCUMENTS

| | | | |
|---|---|---|---|
| 2,783,272 A * | 2/1957 | Young | C07C 313/00 562/126 |
| 3,591,515 A | 7/1971 | Lovely | |
| 4,081,520 A | 3/1978 | Swindells et al. | |
| 4,104,190 A * | 8/1978 | Hartshorn | C02F 1/76 252/187.21 |
| 4,504,442 A | 3/1985 | Rosenblatt et al. | |
| 4,681,739 A | 7/1987 | Rosenblatt | |
| 4,908,188 A | 3/1990 | Jeffries et al. | |
| 5,234,678 A | 8/1993 | Rosenblatt et al. | |
| 5,407,656 A | 4/1995 | Roozdar | |
| 5,705,092 A | 1/1998 | Wellinghoff et al. | |
| 6,238,643 B1 * | 5/2001 | Thangaraj | A61L 2/18 252/187.21 |
| 6,399,039 B2 | 6/2002 | Ostgard | |
| 6,436,345 B1 | 8/2002 | Roensch et al. | |
| 6,440,314 B1 | 8/2002 | Simpson | |
| 6,635,230 B2 | 10/2003 | Klatte | |
| 7,048,842 B2 | 5/2006 | Tremblay et al. | |
| 7,261,821 B2 | 8/2007 | Beardwood | |
| 7,504,074 B2 | 3/2009 | Martens et al. | |
| 7,534,398 B2 | 5/2009 | Dee et al. | |
| 7,625,533 B2 | 12/2009 | Doona et al. | |
| 7,883,640 B2 | 2/2011 | Doona et al. | |
| 8,337,717 B2 | 12/2012 | Doona et al. | |
| 2003/0031621 A1 * | 2/2003 | Gravitt | C01B 11/023 423/477 |
| 2003/0203827 A1 | 10/2003 | Cooper | |
| 2005/0220666 A1 | 10/2005 | Foster | |
| 2005/0249658 A1 * | 11/2005 | Tarbet | C01B 11/024 423/477 |
| 2007/0214577 A1 | 9/2007 | Bianchetti | |

FOREIGN PATENT DOCUMENTS

| | | |
|---|---|---|
| EP | 0196075 | 10/1986 |
| JP | 55035956 | 9/1978 |
| WO | 03/062359 A1 | 7/2003 |

OTHER PUBLICATIONS

Jones et al. "Oxyhalogen-Sulfur Chemistry: Oligooschillations in the Formamidinesulfinic Acid-Chlorite Reaction", J. Phys. Chem. 1995, 99, pp. 1523-1529.*
Kinetics and Mechanism of the Decomposition of Chlorous Acid Attila K. Horva'th, Istva'n Nagypa'l,*, Ga'bor Peintler, Irving R. Epstein,*, and Kenneth Kustin; Jun. 2003.
T. Lehtimaa, V. Tarvo, G. Mortha, S. Kuitunen, and T. Vuorinen Ind. Eng. Chem. Res. 2008, 47, 5284-5290.

* cited by examiner

*Primary Examiner* — Ngoc-Yen Nguyen
(74) *Attorney, Agent, or Firm* — Roger C. Phillips

(57) ABSTRACT

The present invention in one embodiment provides a process of generating chlorine dioxide by reacting formamidine-sulfinic acid (FSA) and sodium chlorite in an aqueous solution.

15 Claims, No Drawings

PROCESS FOR THE GENERATION OF CHLORINE DIOXIDE

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

The present invention relates to a novel chemical composition consisting of quantities of dry starting materials that can be added to water to generate chlorine dioxide [$ClO_2$, Cl(IV) oxidation state] for cleaning, disinfection, sanitization, sterilization, and decontamination of surfaces contaminated with microorganisms or chemical agents without using exogenous power sources (e.g., electricity, open flames, chemical heat), large equipment or generators, or hazardous chemicals such as acids that are difficult to transport, store, handle, or dispose of. Chlorine dioxide is a broad-based biocide that is capable of inactivating a range of classes of contaminating microorganisms (e.g., bacteria, spores, viruses, fungi, protozoa, oocysts, etc.), is environmentally-friendly, and, because of its material compatibility, chlorine dioxide is also one of the safest and most effective decontamination and/or disinfectant methods available today. Chlorine dioxide is a well-known anti-microbial agent used in the decontamination community for its effectiveness against Anthrax (causative agent being spores of *Bacillus anthracis*) and harmful chemical agents. Chlorine dioxide, however, cannot be pre-generated then shipped or transported in trucks or other vehicles to distant locations for its application. For all its uses in decontamination, disinfection, sanitizing, and other purposes, chlorine dioxide must be generated in situ. The present invention provides in situ chlorine dioxide generation with on-site, at point-of-use, and at-will convenience.

The chlorine dioxide generated according to the instant patent application can be used for a wider variety of disinfecting, decontaminating, sanitizing, or sterilizing applications than previously possible anywhere microbial contamination may be an issue while overcoming drawbacks of the prior art and imparting several distinct technological advantages. For example, the chlorine dioxide can be used to decontaminate whole buildings or whole rooms, bio-safety cabinets in research or academic laboratories, hospital rooms, medical and dental facilities, textiles comprising clothing, shelters, and tents, bathrooms and shower facilities, kitchen and dining facilities, laundries, food handling equipment and contact surfaces in processing environments (including fresh produce), boat cabins or rooms in recreational vehicles, and in smaller spaces such as isolators, filtered housings, water purifiers, and laundries, and surfaces of personal use items such as boots and shoes, tools, cosmetic applicators, mouthwash, toothpastes, surgical and dental instruments, and drawing instruments, and contaminated objects in the interior chamber of a closable, vented container (e.g., Portable Chemical Sterilizer, U.S. Pat. No. 7,625,533) for sterilizing microbiologically contaminated surgical instruments, medical equipment, textiles, uniforms, fresh produce, or other contaminated surfaces. An embodiment of the invention also relates to the generation of chlorine dioxide solutions and chlorine dioxide gas for use in educational institutions, such as demonstrations, laboratory experiments, and directed research studies.

The use of the chemical composition of this invention for the generation of chlorine dioxide is particularly suited for military applications, especially in austere conditions restricting water consumption and electrical power demands and favoring lightweight transportability for rapid mobility such as in far-forward deployments, for decontaminating hard surfaces, textiles, shelters, deployable medical units, used surgical instruments, galleys, field kitchens and food service facilities, and laundries, bathrooms, showers, and latrines anywhere large numbers of personnel exist in a shared living environment. An embodiment of the invention empowers personnel with the germ-killing strength of chlorine dioxide, protects health and the environment, and unburdens individuals and the logistics chain through its lightweight design. Similarly, the chemical composition of this invention offers technological advantages that can be readily adapted for use in other types of austere environments such as occur in camping or remote or other outdoor activities, during disaster relief, and in the healthcare activities of less developed countries. The use of the chemical composition of this invention is particularly suited for civilian consumers for industry, retail, and household uses and can be readily adapted for these applications as a stand-alone disinfectant integrated with packaging technologies, or integrated into appliances, water purifiers, or other devices intended for household use.

Another embodiment of the invention is highly suited for educational purposes, in lecture and laboratory demonstrations, for example. In an embodiment of the invention, mixing small quantities of starting materials of a two-component chemical composition of dry reagents in water in a single-step mixing process, wherein the chlorine dioxide in solution is visible within seconds, to rapidly and controllably yield with increased user safety large volumes of dilute chlorine dioxide solutions from concentrations as low as 1-5 ppm to greater than 5000 ppm according to the user's desired concentration and intended purposes. This embodiment is simpler and more convenient in some situations, and it also retains its environmentally benign character as chlorine dioxide. This method can be exploited to develop a simple, safe method to demonstrate in a classroom or lecture hall setting the generation of chlorine dioxide, which can serve as an educational benefit not covered in the prior art.

2. Background of the Invention

Chlorine dioxide is well known for many years to be antiseptic and disinfecting. For its many applications in sanitizing, disinfecting, decontaminating, and sterilizing, chlorine dioxide concentrations are typically used in the ranges of 1-2 ppm, 5-25 ppm, 50-250 ppm, 1000-2500 ppm, or more, depending on the different needs of the individual applications and the desired physical state of chlorine dioxide needed for said applications. Chlorine dioxide is not transportable due to safety regulations, and so it cannot be pre-made then transported. For all its uses in decontamination, disinfection and sterilization purposes, chlorine dioxide must be generated in situ, on-site at point-of-use, and at-will. The need for the safe, environmentally benign generation of chlorine dioxide is not met by the prior art of conventional large-scale and small-scale chlorine dioxide generating equipment based on most oxidation-reduction reactions, electrochemical cells, or acidification. Thus, the prior art for generating chlorine dioxide can be organized into four categories: Oxidation-Reduction, Electrochemistry, Acidification, and Transient Intermediate Chemistry.

There are estimates that $4.5 \times 10^6$ lbs. of chlorine dioxide are used worldwide per day in far-reaching applications relating to paper and pulp mill industry, drinking water and wastewater treatment, food processing/foodservice, health, cooling towers, buildings (mold remediation or bio-threat decontamination), and anywhere microbial contamination is an issue. Because chlorine dioxide attacks lignin but not cellulose, its treatment of paper pulp leads to finished papers of a very desirable whiteness. It is estimated that the paper and pulp industries use as much as 10,000 lb. (4,500 kg) of chlorine dioxide per day to achieve these "bleaching" results. One technology to achieve this output is based on continuous reduction of sodium chlorate [$ClO_3^-$, Cl(V)] in high acid ($H^+$) either in homogeneous chemical reactors or in electrochemical reactors. The acids used are hydrochloric acid (HCl, e.g., Day-Kesting Process) and sulfuric acid ($H_2SO_4$, e.g., Rapson Processes). Reductants include chloride [$Cl^-$, Cl(—I)], sulfur(IV) (i.e., $SO_2$), and methanol (Solvay Process). These processes are described in handbooks and encyclopedias of chemical technology; for example, in "Ullmann's Encyclopedia of Industrial Chemistry, $6^{th}$ ed.," which is hereby incorporated herein as a reference. Swindells et al. (U.S. Pat. No. 4,081,520) teach the refinement of the reduction of chlorate, wherein this process can be automated. Other technologies utilize the dichlorine [$Cl_2$, Cl(0)] or hypochlorite [$OCl^-$, Cl(I)] oxidation of chlorite [$ClO_2^-$, Cl(III)] to produce chlorine dioxide ($ClO_2$). Beardwood teaches the further refinement of this art through automatic monitoring (U.S. Pat. No. 7,261,821 B2), and Martens et al. (U.S. Pat. No. 7,504,074 B2) teach programmable logic controllers and other changes to achieve responsive, fully automated control. While producing chlorine dioxide by the reduction of chlorate may be a process suitable in an industrial setting dedicated for that purpose, producing chlorine dioxide by chlorate reduction chemistry is technologically very undesirable and potentially hazardous, particularly in smaller, confined spaces such as kitchens, hospital rooms, rest rooms, class rooms, boats, or recreational vehicles, because all of the starting materials, unconsumed reactants, and byproducts (e.g., dichlorine for chlorate methods) are too dangerous, corrosive, or environmentally hazardous in such situations.

In the production of chlorine dioxide for potable water purification and wastewater disinfectant treatments, typical outputs in the amount of 220 lb. (100 kg) are produced per day and rely mainly on the oxidation of sodium chlorite ($ClO_2^-$) by dichlorine ($Cl_2$). To perform this method of chlorine dioxide production, users commonly transport and bring to the treatment site pressurized cylinders of the dichlorine gas, which is a hazardous and combustible material. This method uses water as the medium to dissolve sodium chlorite, and teaches the flow of the dichlorine gas through this solution or passage of an electrical current through this solution to oxidize the chlorite ion [$ClO_2^-$, Cl(III)] to chlorine dioxide [$ClO_2$, Cl(IV)]. Dichlorine itself is highly soluble in water. Upon dissolution it rapidly reacts with water to release hydrogen ion ($H^+$), chloride ion ($Cl^-$), and hypochlorous acid [HOCl, Cl(I)]. Hypochlorous acid dissociates into hydrogen ions ($H^+$) and hypochlorite ions ($OCl^-$). All four chemical species, the parent dichlorine and its three hydrolysis products, co-exist in rapid equilibrium, and the complete equilibrium description should, therefore, involve all of these species. To hasten the chlorite-dichlorine reaction, those skilled in the art of chlorine dioxide production may choose to add acid, usually hydrochloric (HCl), to the reaction mixture.

The production of chlorine dioxide [$ClO_2$, Cl(IV)] from the two components chlorite [$ClO_2^-$, Cl(III)] and dichlorine [$Cl_2$, Cl(0)] gas is exemplified in Jefferis, I I I et al. (U.S. Pat. No. 4,908,188). This patent teaches the necessity of preventing accidents and ensuring safety. It also recognizes the extreme corrosivity of dichlorine gas and its hydrolysis products, and, therefore, it teaches how to practice equipment redundancy (i.e., continued re-use of the generating apparatus), reliability and safety. The art further teaches controls, safety valves, and continuous monitoring of feedstock throughput and concentrations of chemical species. Problems inherent in the chlorite-dichlorine method of chlorine dioxide production include impurities in sodium chlorite that delay initiation of reaction with dichlorine, the presence of unreacted dichlorine in the output effluent gas, and the removal of chlorine dioxide after generation and use. These problems were overcome by Rosenblatt et al. (U.S. Pat. No. 5,234,678) by introducing carbon dioxide along with dichlorine to remove the sodium hydroxide impurity in sodium chlorite that delayed the production of chlorine dioxide; removing unreacted dichlorine gas by passage of the effluent gas through particulate soda-lime (comprised of calcium hydroxide, $Ca(OH)_2$, water, $H_2O$, sodium hydroxide, NaOH, and potassium hydroxide, KOH); and by removing residual chlorine dioxide by passage of used gas through a sodium thiosulfate ($S_2O_3^{2-}$) reductant solution. Clearly, this method is not suitable for on-site, energy-independent generation of chlorine dioxide for small-scale applications in confined spaces.

Sodium persulfate [$S_2O_5^{2-}$, S(VII)] is another specific chemical oxidant which has the requisite electrochemical potential to oxidize sodium chlorite [$ClO_2^-$, Cl(III)] to chlorine dioxide [$ClO_2$, Cl(IV)]. Rosenblatt et al. teach the use of persulfate in the generation of chlorine dioxide gas for disinfection and decontamination (U.S. Pat. Nos. 4,504,442 and 4,681,739). This reaction is relatively slow, requiring 30-45 min at room temperature to produce the desired amount (approx. 11-113 ppm) of chlorine dioxide.

The oxidation of sodium chlorite [$ClO_2^-$, Cl(III)] to chlorine dioxide [$ClO_2$, Cl(IV)] can be accomplished in an electrolysis cell. Tremblay et al. (U.S. Pat. No. 7,048,842 B2) teaches the use of a porous anode to accomplish this purpose electrochemically. Though the electrode processes have not been fully identified, passing an aqueous sodium chlorite feed solution through an electrolysis cell during the passage of electrical current converts a portion of the chlorite ion to chlorine dioxide. To improve conversion efficiency, the effluent solution can be recycled through the electrolysis cell. These additional steps are required to ensure the safety, redundancy, and efficiency of these electrochemical processes and also serve to illustrate the extra demands imposed for the continuous production of chlorine dioxide. The more numerous batch reaction methods for disinfection and decontamination of personal, medical, kitchen and recreational items and spaces with chlorine dioxide typically do not require such complex systems of powered equipment for production.

When generating chlorine dioxide in the form of dilute solutions or dilute gases or gas-phase mixtures, the acid-induced formation and disproportionation of chlorous acid [$HClO_2$, Cl(III)] is commonly used. In the process of acidification, acid is added to a chlorite ion solution, whereupon chlorous acid forms and begins to disproportionate. Disproportionation itself is a complex form of oxidation-reduction reaction. Specifically, chlorous acid is thermodynamically unstable; it self-oxidizes and self-reduces to form more stable species. In this reaction, chlorous acid containing a chlorine atom of oxidation number+3 self-reacts to form a set of chlorine atom-containing products, some with higher oxidation numbers (+4, +5) and some with lower oxidations numbers (−1) than that of the chlorine atom initially in the disproportionating chlorous acid (+3). For the in situ generation of chlorine dioxide by acidification, an acid compound (usually a strong mineral acid) must accompany the chlorite during transportation, which creates the logistics burden of transporting hazardous materials (corrosive acids) that can endanger human health and are noxious to the environment. The resultant chlorine dioxide solution so produced is also acidic. These acidic materials require additional steps to ensure proper transportation, handling, storage, and safe disposal. Additionally, acid solutions can be corrosive to some surface materials, even while they are being disinfected by chlorine dioxide.

Where the oxidation of sodium chlorite by a particular oxidant requires specific constraints, conditions, and amounts characteristic of the chosen method, the acidification of sodium chlorite followed by disproportionation is decidedly different. It is an invariant process that always involves the same reaction, irrespective of the acidification agent. The stoichiometry and kinetics of this acidification reaction have been studied by many investigators; the contents of these published investigations are hereby incorporated herein into this application, particularly, "Kinetics and Mechanism of the Decomposition of Chlorous Acid," J. Phys. Chem. A 2003, 107, 6966-6973, by A. K. Horváth, I. Nagypál, G. Peintler, I. R. Epstein, and K. Kustin, which summarizes the most recent and relevant of the previous studies. Since the acid dissociation constant chlorous acid is $K_a \approx 1 \times 10^{-2}$ M, or written as $-\log K_a = pK_a \approx 2$ (vide Horváth et al.), the goal of acidification is to raise the hydrogen ion ($H^+$) concentration in the aqueous medium to a level where Cl(III) is present primarily or substantially as undissociated chlorous acid ($HClO_2$) and not as dissociated chlorite ion ($ClO_2^-$). In actual practice, a person skilled in the art of chlorine dioxide production would add acid to lower the solution pH, preferably to a value in the vicinity of the chlorous acid pKa (i.e., so that $pH \leq pK_a$), and disproportionation becomes observable as the formation of chlorine dioxide.

It is known to those familiar with the art and science of chlorous acid disproportionation that in certain situations this disproportionation process is too slow to be of practical benefit. Three methods are used to speed up this reaction: increasing the hydrogen ion ($H^+$) concentration, increasing the chloride ion ($Cl^-$) concentration, and adding noble metal catalysts (Ostgard, U.S. Pat. No. 6,399,039). Strong mineral acid (primarily HCl or $H_2SO_4$) at concentrations 0.01 M or higher suffice to lower the pH to the point where disproportionation serves as a practical source of chlorine dioxide. At the later stages of the reaction, the chloride ion produced by the disproportionation reaction may reach a concentration sufficient to accelerate the reaction appreciably. Using hydrochloric acid to control the pH achieves the dual purpose of lowering the initial pH and accelerating the reaction by contributing chloride ions. When a weak acid such as citric acid is used as the hydrogen ion source, it is usually present in relatively large stoichiometric excess to provide sufficient acceleration to the reaction to be practical. Noble metal catalysts accelerate the chlorous acid disproportionation, but also add to the cost of chlorine dioxide production. To offset the increased cost, the catalyst can be recycled, but this process detracts significantly from the ease-of-use of the disproportionation method. It is further clear to those familiar with the art of chlorine dioxide production via acidification that the chlorous acid disproportionation reaction results in a spent solution too acidic, and therefore too hazardous, to be disposed down the drain, and requires additional steps not inherent in the production of chlorine dioxide, such as first raising the pH by neutralization, that compromise user-friendly convenience.

An early method for making chlorine dioxide on site through acidification was disclosed by Lovely (U.S. Pat. No. 3,591,515). The method taught by Lovely allows powdered sodium chlorite and a powdered proton source such as iron(III) chloride or citric acid to be mixed without reacting. These precursors are actually in the form of solutions adsorbed on solid substrates such as calcium silicate. Upon addition of water, protons are released and chlorine dioxide evolves. Such solid-state mixtures that release chlorine dioxide occur over time periods that are measured in weeks. Wellinghoff et al. (U.S. Pat. No. 5,705,092) teach sustained release of chlorine dioxide from multi-layered composites in which sodium chlorite is interspersed with dry acid-releasing agents. Upon exposure to water, acid is released and the chlorine dioxide evolves.

More copious release of chlorine dioxide by acidification is taught by Roensch et al. (U.S. Pat. No. 6,436,345 B1) in which the hydration of carbon dioxide serves as the proton source. Another method of allowing precursors to be in contact without reaction occurring is disclosed by Klatte (U.S. Pat. No. 6,635,230 B2), who teaches impregnation of zeolite crystals with sodium chlorite, such crystals mixed with proton generating substances. No reaction occurs until the water is added, whereupon chlorine dioxide is released.

It is well known in the chemical and chemical engineering arts that reactive precursors in solution can be segregated behind barriers such as valves or membranes prior to mixing. Roozdar (U.S. Pat. No. 5,407,656), for example, teaches the dissolution of reaction precursors in solution or in gel form in separate vessels. The solutions are then transported into a reaction chamber by opening of appropriate valves. To speed up the slow disproportionation reaction, and to make the rate of reaction more practical without using strong mineral acids, Roozdar teaches the addition of hydroxyl-free aldehydes such as glutaraldehyde to the reaction mixture. Dee et al. (U.S. Pat. No. 7,534,398 B2) teach the use of a membrane that dissolves when contacted by water to allow the segregated precursor solutions to react. Dee et al. teach a multi-compartmentalized apparatus for producing chlorine dioxide in aqueous solution, the gas phase, or as a mist for use in disinfecting personal or commercial items. An apparatus of Foster (US Patent Application 2005.0220666 A1) similarly teaches the use of chlorine dioxide among other "sterilants" for the purpose of disinfecting personal items, but does not specify how the chlorine dioxide is to be generated.

For certain applications such as treating industrial wastewaters or cleaning contact lenses, it may be necessary to remove or destroy chlorite from solution, and the disproportionation reaction finds use for this purpose. Kenjo et al. (EP No. 0196075 B1) disclose the cleaning of contact lenses by immersion of a soiled lens in an aqueous solution containing detergent and sodium chlorite in a patent marred by numerous ambiguities and errors. Following immersion, the cleaning solution with the soiled contact lens therein is boiled, for example, " . . . at 1000 [sic] C. for 15 min." The solution is cooled, whereupon any one of many named organic and inorganic acids may be added. It is clear from the context of this patent that this invention is not energy-independent and that the purpose of adding acid is acidification, to remove unreacted chlorite by forming the so-called and undefined species "free oxygen." Simpson (U.S. Pat. No. 6,440,314 B1—vide for a critique of Kenjo et al.) teaches the addition of ascorbic acid or its diastereomer erythorbic acid to industrial wastewater to remove chlorite.

Simpson teaches the addition of sufficient ascorbic acid so that its concentration exceeds that of the contaminating chlorite. For example, Simpson states his " . . . invention employs approximately 5 ppm ascorbic acid to consume 1 ppm of chlorite ion." Simpson further teaches that as a result of this treatment: "No chlorine dioxide is formed as long as ascorbic acid is in a slight excess."

Industrial and municipal wastewater may contain contaminants that resist bacterial decomposition. Pre-treatment with strong and rapidly reacting oxidants can reduce the influence of contaminants such as surfactants and polyvinyl alcohols, and recondition the waste water for successful bacterial processing. Therefore, Tani et al. (Japanese Patent JP55035956) teach pre-treatment of wastewater with strong oxidants such as ozone or Fenton's reagent (hydrogen peroxide, $H_2O_2$, and an iron(II) salt). Cooper et al (U.S. Patent Application 2003/0203827) teach the addition of a mixture of chlorite and chlorate salts to wastewater, followed by acidification. Acidification forms chlorous acid, which disproportionates, releasing chlorine dioxide. The contaminated water so treated is allowed to circulate for several hours, thereby removing organic constituents and significantly reducing bacterial populations. This treatment should yield sufficiently decontaminated water that can be used for purposes such as cooling tower water.

Even the cleaning of surfaces such as those encountered in kitchens, bathrooms, shower, and laundry facilities can be rendered more efficient following pre-treatment with strong oxidants. Blagg et al. (International Patent Application WO03/062359 A1) teach the use of pH control to create a cleaning composition that is efficacious against contaminants that require either alkaline or acidic conditions for their removal. Coupled to the pH-elevating and pH-lowering components of the cleaner are reductants and oxidants. The addition of chlorite salts into the cleaner results in the production of chlorine dioxide during the pH-lowering phase of the cleaning, therefore, affording an antiseptic capability to this cleaner. Bianchetti et al. (U.S. Patent Application 2007/0214577 A1) teach the use of chlorite salts acidified, for example, with citric acid to pre-treat stains in fabrics prior to laundering, reportedly without harming the fabric.

It is understood that the generation of chlorine dioxide in the art prior to U.S. Pat. Nos. 7,625,533; 7,883,640; and 8,337,717 never teaches the reduction of chlorite; but rather, teaches only the oxidation of chlorite, the reduction of chlorate, or the disproportionation of chlorous acid formed by the acidification of chlorite, whose technological disadvantages and drawbacks the reduction of chlorite overcomes. As oxidation-reduction reactions involve electron transfer, it requires a fundamentally different type of chemical technology than occurs with the proton transfer inherent in acidification. As oxidation removes electrons and reduction contributes electrons, their fundamental difference in the direction of flow of matter render them distinct and separable chemical technologies, with no route obvious or otherwise, for transposing their fundamentally different character.

Doona et al. U.S. Pat. Nos. 7,625,533; 7,883,640; and 8,337,717 teach the generation of chlorine dioxide from chlorite by the reduction of chlorite using a novel electron-transfer effector in a chemical combination consisting of water, chlorite as oxidant, ascorbate ion as an electron-transfer chemical effector at sub-stoichiometric levels, sulfite as reductant, and iron-activated magnesium, with suitable permutations and substitutions possible for each chemical component comprising this system. The role of an electron-transfer chemical effector in the reduction process is critical: it initiates, speeds up, and alters the mechanism of the reaction between the oxidant and reductant leading to the controlled production of chlorine dioxide. The redox-active electron-transfer chemical effector interacts through fast (kinetically labile) redox reactions with chlorite to generate transient reactive intermediates, which induce the otherwise slow (kinetically inert) chlorite-reductant reaction to proceed according to alternative reaction pathways involving free radicals and electron-transfer and/or atom-transfer processes. In the absence of such an electron transfer chemical effector, the oxidant-reductant reaction is inert and does not proceed, particularly not on any practical timescale. The addition of a separate electron-transfer chemical effector thereby provides a combination that helps overcome the kinetic inertness of the otherwise thermodynamically-favorable, exothermic oxidant-reductant reaction, and controllably produces chlorine dioxide on a practical and relatively short timescale.

The generation of chlorine dioxide in the art of U.S. Pat. Nos. 7,625,533; 7,883,640; and 8,337,717 teach the use of an electron transfer chemical effector and the reduction of chlorite in the production of concentrated aqueous solutions of chlorine dioxide, whose concentrations are typically in the range of 500-5000 ppm or greater, including in the first stages of the art of Doona et al. U.S. Pat. No. 8,337,717, that involves the subsequent production of more dilute (>100 ppm chlorine dioxide) solutions. In fact, Doona et al. U.S. Pat. No. 8,337,717 requires a 2-step mixing process, wherein reagents are mixed in a small volume of solvent in Step 1 (called "pre-concentration") to produce a concentrated solution of chlorine dioxide (1500-5200 ppm or greater), and the concentrated chlorine dioxide solution is diluted with solvent in Step 2 (called "post-reaction dilution") by a factor of (26-106)-fold, resulting in an aqueous chlorine dioxide solution at its final working solution of >100 ppm. This 2-step mixing process is required to exert kinetics control over the chemical reaction processes to control the timescale of the reaction of 2-10 minutes and yield a relatively dilute (>100 ppm) chlorine dioxide solution. Adding all of the water (800 mL) initially to a composition (4.7 g chlorite, 1.3 g ascorbate, and 0.7 g sulfite) that produces >250 ppm chlorine dioxide when pre-concentrated in 15 mL results in reagent concentrations that are too dilute, such that the reaction effectively never takes place (0 ppm chlorine dioxide produced after 65 minutes), thereby being too slow for any practical utility.

With the aforementioned in view, it is clearly evident that until now there is presently no good, safe, rapid, and user-friendly method for rapidly and controllably producing dilute chlorine dioxide solutions involving the reduction of chlorite in a single-step mixing process for end-user convenience and ease-of-use for on-site, at-will, point-of-use, in situ production of chlorine dioxide. The present invention can rapidly produce aqueous chlorine dioxide solutions as dilute as 1-5 ppm with 1-step mixing, and thereby eliminates the need for the 2-step mixing process (exemplified in the art of Doona et al U.S. Pat. No. 8,337,717). The present invention rapidly produces chlorine dioxide solutions at concentrations of 1-10, 25-50, 50-100, or 100-250 ppm or greater. It is to be understood by practitioners familiar in the art that the present invention can also produce chlorine dioxide concentrations ≥500, 1500, 2500, 5000 ppm, or greater in the same 1-step process without changing the fundamental invention herein. The present invention also produces chlorine dioxide by combining only two chemical components in water, and therefore eliminates the need for an electron transfer chemical effector to initiate chemical reaction, thereby providing a distinct advantage over prior art, including the aforementioned art embodied in U.S. Pat. Nos. 8,337,717; 7,625,533; and 7,883,640.

BRIEF SUMMARY OF THE INVENTION

One embodiment of the invention is generally directed to a process of reacting formamidinesulfinic acid (FSA) and sodium chlorite in an aqueous solution to generate chlorine dioxide. Preferably, chlorine dioxide is produced to a concentration of about 1-5 ppm, 5-50 ppm, 50-150 ppm, 150-500 ppm, or greater than 5000 ppm. The aqueous solution may be water of pH 6-8. Optionally, the aqueous solution comprises a pH buffering agent. The buffering agent is preferably sodium phosphate, monobasic dehydrate, sodium phosphate dibasic, sulfate, citrate, sulfamate, or metabisulfite. Preferably, the aqueous solution is buffered at a pH of about 4 or a pH of about 2.

The process of reacting formamidinesulfinic acid (FSA) and sodium chlorite in an aqueous solution is preferably conducted wherein the amount of chlorite is in excess of the amount of FSA. More specifically, the process is preferably conducted where the mole ratio of chlorite to FSA is in the range of (2-161):1. In one preferable embodiment, the process is conducted wherein the amount of sodium chlorite is between 0.7-2.7 g and the amount of FSA is between 0.1-0.65 g, respectively.

The process of reacting formamidinesulfinic acid (FSA) and sodium chlorite in an aqueous solution is preferably conducted such that the moles of water are in excess of the moles of chlorite. More specifically, the process is preferably conducted where the mole ratio of water to chlorite ranges from to (27-8658):1. A preferable amount of water used in the process ranges from 15-1200 mL.

The process of reacting formamidinesulfinic acid (FSA) and sodium chlorite may be conducted by using an FSA precursor to produce FSA. Preferred examples of FSA precursor are thiourea, formamidinesulfenyl acid, and formamidinesulfonic acid. More specifically, the FSA is produced by chemical reaction of an FSA precursor with an oxidant, said oxidant selected from the group consisting of bromine, bromite, hypobromous acid, bromate, iodate, iodine, persulfate, and hydrogen peroxodisulfate, and hydrogen peroxide.

The process of reacting formamidinesulfinic acid (FSA) and sodium chlorite in water or aqueous solution occurs in a single step. The 1-step process of reacting FSA and chlorite may be initiated by separately adding the FSA and the sodium chlorite to water in any sequence or concomitantly to generate an aqueous chlorine dioxide solution. Alternatively, the FSA and the sodium chlorite are pre-mixed together before adding to the aqueous solution. In one embodiment, the FSA and the sodium chlorite are first mixed together in the form of loose powders, granules, compressed pellets, capsules, or tablets before the mixture is added to the aqueous solution.

The present invention provides a process for reacting FSA and chlorite produces aqueous chlorine dioxide solutions that is visible within seconds of combining and completes within minutes through this 1-step mixing process to produce dilute concentrations of chlorine dioxide from as low as 1-5 ppm to greater than 5000 ppm. Thus, it is clear that the present invention combines only two dry chemical components in water to produce aqueous chlorine dioxide solutions, and in so doing eliminates the need for adding a chemical effector to initiate the chemical reaction that is an essential component in the prior art of U.S. Pat. Nos. 8,337,717; 7,625,533; and 7,883,640. By producing aqueous chlorine dioxide solutions in one step, the present invention eliminates the need for the 2-step mixing process ("pre-concentration" and "post-reaction dilution") that is required to produce dilute aqueous chlorine dioxide solutions according to the art of Doona et al U.S. Pat. No. 8,337,717. It is understood by practitioners in the art that the present invention could be scaled up to generate chlorine dioxide concentrations ≥500, 100, 2500, or 5000 ppm in a single-step mixing process and without the need for a chemical effector.

The process of reacting formamidinesulfinic acid (FSA) and sodium chlorite may further comprise the step of transporting the generated aqueous chlorine dioxide from the solution phase to the gaseous phase. This stage is not required for the production of aqueous-phase chlorine dioxide and does not constitute a second step in the mixing process, but rather, it affords an additional usage of the aqueous-phase chlorine dioxide so produced by the single step mixing process described above.

DETAILED DESCRIPTION OF THE INVENTION

One aspect of the invention provides a simplified 2-component dry chemical system, wherein no chemical effector is needed as a third component, that combine in a 1-step mixing process in aqueous solution that eliminates the needs for "pre-concentration" and "post-reaction dilution," and provides advantages for steadily producing dilute chlorine dioxide solutions in relatively larger solution volumes for concentrations from as low as 1-5 ppm to greater than 5000 ppm according to the user's desired concentration and intended purposes, and with increased user safety and convenience.

Another aspect of the invention relates to the use of aqueous solution-phase chemistry comprising the combining of a transportable, safe, dry chemical composition in water to rapidly and controllably generate chlorine dioxide in situ, at-will, on-site of application, and at point-of-use using benign starting materials, and without requiring large, electrical- or otherwise-powered equipment that is difficult to transport, install, or operate. The environmentally-friendly aspects of chlorine dioxide (a "green" technology) are well known in the art. The ease of generation; simplicity of the mixing procedure; controllability of the reaction, reaction rates, and concomitant exothermic heat generation by adjusting the reaction conditions; energy-independence; lightweight transportability; and the environmentally benign character of this composition avoids the addition of corrosive acids and other potential hazards to protect the safety of users and the environment during transportation, storage, handling, or disposal are all advantages of the present invention compared to other known disinfectant/decontamination technologies, including those that use chlorine dioxide generated in another manner.

The chemical composition of the instant invention consists of a chlorine-containing chemical oxidant, a sulfur-containing chemical reductant to reduce said chlorine-containing chemical oxidant plausibly through reaction with the sulfur moiety, and water, and operating in either batch mode or continuous-flow conditions using a continuous-flow stirred tank reactor. The chemical composition of the instant invention can be readily adapted for use with existing commercial mixed-chemical and packaging technologies, wherein an embodiment of the invention can be incorporated into tablets, pellets, sachets, capsules, soluble membranes, or packets of dry powders containing soluble components to control the rate of dissolution, to induce effervescence, to buffer solution pH, or to act as surfactants or detergents. Optionally, other embodiments may be in forms integrated onto flexible pouch or rigid plastic packaging materials used to form containers, or stored inside containers and in separate chambers or compartments, including those that can be formed by frangible seals that release under slight pressure, such as squeezing the container by hand. Accordingly, the composition may contain other salts, ions, electrolytes, pH buffers, or surfactants familiar as standard practice in the art of mixed chemical technologies without changing the essential principles or fundamental processes of an embodiment of this invention, as recognizable by one skilled in the chemical arts.

This invention generates chlorine dioxide in aqueous solution and the chlorine dioxide so-generated can be used together or separately in either gaseous, aqueous, or aerosol forms by off-gassing by passive or facilitated evaporation, pouring or immersing, or spraying in the form of an aerosol from a sprayer device to induce contact with contaminants on surfaces or in water for the purpose of decontamination of microbiological or chemical agents. For example, the chlorine dioxide can be generated in aqueous solution, then off-gassed using a flow of an inert carrier gas, heat, concentrations in excess of the solubility limitations of aqueous medium, fans, passive evaporation, or other methods familiar in the art. Aerosol chlorine dioxide can be generated using a pump, handheld trigger sprayer, or any similar such device recognizable in the art and in which the chlorine dioxide is generated and dispensed as a mist onto surfaces, typically for spray and wipe applications. Aqueous chlorine dioxide can be generated in a bottle or other container for subsequent dispensing as a solution via pouring onto contaminated surfaces or objects, or in a container or receptacle for receiving and immersing contaminated objects, such as occurs in flume rinses for fresh produce, or buckets for immersing cleaning or other utensils (e.g., mops, sponges, swabs) that ensure chlorine dioxide contacts contaminated surfaces of received objects. The aqueous chlorine dioxide can be generated in water or non-potable or wastewater sources for water purification, disinfection, or decontamination, or the aqueous chlorine dioxide can be generated then added to water, non-potable water, or wastewater sources for purposes of water treatment, disinfection, or decontamination.

One preferred embodiment of the chemical composition of the instant invention consists of water, a chlorine-containing chemical oxidant, a sulfur-containing chemical reductant to reduce said chlorine-containing chemical oxidant plausibly through reaction with the sulfur moiety. In one preferred embodiment of the instant invention, the chlorine-containing oxidant is chlorite. In one preferred embodiment of the instant invention, the sulfur-containing reductant is Formamidinesulfinic acid (abbreviated FSA and also called "methanesulfinic acid, aminoimino" or "thiourea dioxide"). The use of a single reductant in accordance with an embodiment of the invention, FSA, allows for 1-steps mixing to produce chlorine dioxide in aqueous solution and replaces the needs for adding a separate electron-transfer chemical effector (ascorbate) and for 2-step mixing in accordance with the relevant prior art (U.S. Pat. Nos. 7,625,533; 7,883,640; and 8,337,717).

1. Example Tests Demonstrating Chlorine Dioxide Production and Anti-Microbial Activity of the Present Invention

TABLE 1

Concentration conditions at ambient pressure and temperature (25° C.) encompassing embodiments of the present invention for the formation of chlorine dioxide.

| Chlorite (g) | FSA (g) | Volume (mL) | Solvent | ClO$_2$ (ppm) | Time (seconds) |
|---|---|---|---|---|---|
| 2.7 | 0.65 | 15 | Water | | |
| 1.4 | 0.1 | 15 | Water | | |
| 0.7 | 0.2 | 60 | pH 3.8 sulfate | | |
| 1.4 | 0.1 | 30 | Water | | |
| 1.4 | 0.2 | 15 | Water | | |
| 1.4 | 0.2 | 500 | pH 2 sulfate or citrate | | |
| 1.4 | 0.2 | 300 | pH 4 phosphate | | |
| 1.4 | 0.2 | 30 | pH 6, pH 7 phosphate | | |
| 0.11 | 0.070 | 1200 | water | 1 | 30, 60 |
| 0.12 | 0.024 | 600 | water | 1-3 | 30, 60 |
| 0.12 | 0.023 | 600 | water | 5.1 | 5400 |
| 0.17 | 0.024 | 200 | water | 39.3 | 5400 |
| 0.50 | 0.300 | 50 | pH 4 phosphate | >250 | 240 |
| 1.00 | 0.400 | 50 | pH 4 phosphate | >250 | 130 |
| 1.00 | 0.570 | 20 | water | >5900 | 1800 |

Test 1

For illustrative purposes only, and not intended in any way to limit the various embodiments or the scale or scalability of the present invention, the following embodiments exemplify the rapid and safe chlorine dioxide generation by the FSA-chlorite reaction, and are suitable for demonstration before a live audience. To a 250 mL flask or beaker add 200 mL H$_2$O (6<pH<8), 0.17 g NaClO$_2$ as solid powder or dry granules, and stir to initiate dissolution of the solid. To this mixture, add 0.024 g of the FSA solid granules. The solution develops a pale yellow color as visible evidence of the formation of ClO$_2$ almost immediately (Table 1). Mixing, stirring, or swirling encourages the smooth progression of the chemical reaction and shows no noticeable generation of exothermic heat. At 1.5 hours after initiating the mixture, the UV/vis spectrophotometric test of a small sample of this solution had the characteristic absorbance spectrum of chlorine dioxide with an absorbance maximum at 360 nm of 0.70, which equates to about $5.83 \times 10^{-4}$M or 39.3 ppm.

A second embodiment of this invention consists of adding to a 1000 mL flask or beaker 600 mL of H$_2$O (6<pH<8) and 0.115 g NaClO$_2$ and 0.023 g FSA as solid powders or granules. The solution almost immediately develops a pale yellow color as a visual indicator of the formation of the yellow color of chlorine dioxide (Table 1). At 1.5 hours after initiating the mixture, the UV/vis spectrophotometric test of a small sample of this solution had the characteristic absorbance spectrum of chlorine dioxide with an absorbance maximum at 360 nm of 0.09, which equates to about $7.5 \times 10^{-5}$M or 5.1 ppm.

In another embodiment of this invention using the composition containing specifically 0.119 g of ClO$_2^-$, 0.024 g of FSA, and 600 mL of water, chlorine dioxide indicator test strips showed the concentration of chlorine dioxide produced in solution was 1-3 ppm when tested at 30 and 60 seconds after combining reagents (Table 1). Another embodiment of this invention using the composition consisting of 0.114 g of chlorite, 0.07 g of FSA, and 1200 mL of water produced 1 ppm chlorine dioxide solution at 30 seconds and at 60 seconds after mixing reagents and testing with a chlorine dioxide indicator strip (Table 1). These relatively rapid reactions for the production of dilute chlorine dioxide solutions are not intended to be limiting. Another embodiment of this invention containing 1 g of $ClO_2^-$, 0.57 g of FSA, and 20 mL of water produced 5900 ppm aqueous chlorine dioxide solution in 30 min. The results of these and other embodiments of this invention are summarized in Table 1.

Test 2

A 0.2 M phosphate buffer solution adjusted to pH=4 was prepared. To 50 mL of pH=4 buffer solution 0.5 g of sodium chlorite solid was added and the absorbance measured using UV/Vis experiments to monitor the formation of chlorine dioxide from its known absorption spectrum with a maximum absorptivity at 360 nm. Scans taken at various time intervals up to 10 minutes revealed that no chlorine dioxide had formed. Then, 0.30 g of solid FSA was added to the beaker and the mixture was stirred. In less than 10-15 seconds, even before all the FSA had dissolved, the solution color showed formation of a discernible yellow color with a mild bleach-like odor. Absorbance spectra taken by about 2.5 minutes after the addition of FSA showed the distinctive absorbance spectrum of chlorine dioxide with a maximum at 360 nm. Using $ClO_2$ color indicator strips showed a rough estimate of the concentration at 4 minutes was >250 ppm.

Test 3

For this test, the experimental conditions were modified slightly from Test 1. Specifically, 1.0 g of sodium chlorite solid was added (time t=0) to 50 mL of 0.1 M phosphate buffer solution at pH=4, and the initial absorbance spectrum showed no chlorine dioxide had formed. Absorbance scans were taken at various intervals up to t=16.5 minutes, and no chlorine dioxide was detectable at 360 nm. At t=18 minutes, 0.4 g of solid FSA was added to the mixture and shaken and stirred vigorously. Within 5-10 seconds of the addition of FSA, a noticeable yellow color formed with a mild bleach-like odor. UV/Vis spectra taken 45 seconds later (post-addition of FSA) showed the appearance of $ClO_2$ in the absorbance spectrum, whose concentration increased progressively according to spectra taken at 1.50 minutes and 9:58 minutes. Chlorine dioxide color indicator strips taken at 2.17 minutes estimated a chlorine dioxide concentration >250 ppm.

Test 4

For this test, a stock solution of chlorine dioxide was prepared by mixing chlorite and FSA in water, and the concentration (in ppm) was determined using UV/vis spectrophotometry. The stock solution was diluted with water to create solution concentrations at various increments over the range of 0-200 ppm. Two different types of textile samples were inoculated with aqueous suspensions of bacterial spores of either *Bacillus amyloliquefaciens* or *Bacillus anthracis* Sterne as representative surrogates for biological agents, then the textile samples were air-dried. One textile sample is actually used in making clothing and consists of a cotton/nylon blend, and the second is an experimental weatherproof fabric intended for potential use as rain-proof outer clothing. Individual inoculated textile samples were immersed in an aqueous solution of chlorine dioxide concentration and the solution was quenched at 10 minutes by adding excess dry reductant sodium sulfite to inactivate the chlorine dioxide. Surviving spores were recovered on appropriate nutritive agar medium, incubated at 35° C. for about 20 hours, then enumerated. Results depended on the concentration of chlorine dioxide, time of immersion, the particular bacterial spore species, and the composition of the textile material. Specifically, 10 minutes exposure of an inoculated textile sample immersed in 200 ppm aqueous chlorine dioxide generated by the presently claimed invention effectuated complete sterilization of the cotton/nylon fabric with respect to the presence of contamination by *B. amyloliquefaciens* spores (7.26 log reduction) and significant decontamination of the experimental weatherproof fabric (2.35 log reduction) as contaminated by inoculation with *B. amyloliquefaciens* spores. For both textile materials, 10-minute treatments with either 80 or 40 ppm chlorine dioxide significantly reduced but did not completely eliminate the presence of *B. amyloliquefaciens* spores. Treatments for 10 minutes with chlorine dioxide solutions in concentrations of 200, 80, or 40 ppm chlorine dioxide generated by the presently claimed invention sterilized the cotton/nylon fabric with respect to contamination by *B. anthracis* Sterne spores (7.50 log reduction).

These embodiments do not limit or restrict the claimed invention by initial concentration, yield of chlorine dioxide, timeframe of reaction, or in any other aspect. These tests demonstrate the capacity of the presently claimed invention to react virtually instantaneously and progressively in a single step mixing of two (2) dry chemical components in aqueous medium, and without requiring waiting for reaction initiation by an electron transfer chemical effector, without significant exothermic heat generation, without bubbling (evolution of carbon dioxide, $CO_2$, or other gases), and without the particular needs for additional steps of pre-concentration and post-reaction dilution in the mixing process. The essential character of this invention is based on the fundamental chemical principles of reactivity and reaction-diffusion, as exemplified in these embodiments, and can be exploited to produce scalably larger (or smaller) quantities of chlorine dioxide, volumes of solution, or higher (or lower) chlorine dioxide concentrations, particularly using mixed chemical technologies such as tablets or other means that regulate contact between the reactive entities in such a manner as to control the resultant rate and yield of chlorine dioxide production for efficient practical use. These embodiments, or ones sufficiently similar, can also serve as the basis for pedagogical development of a lecture-demonstration of the reaction chemistry and the practical uses of chlorine dioxide solutions. This type of embodiment can, moreover, be used, for example, in directed research to generate useful amounts of high purity chlorine dioxide such as might be used for decontaminating, disinfecting, sanitizing, sterilizing, cleaning, for other similar such applications, or for further investigation. A feature of this embodiment of the invention is the practical generation of chlorine dioxide in small quantities for individual uses as a disinfectant for military purposes in austere deployments or in households or businesses in small, confined spaces, or for larger uses for whole room or whole building decontamination of biological or chemical agents, food service facility sanitation, to uses in even larger facilities or for decontamination of vehicles, materiel, or other large equipment, wherein an appreciable and visibly observable fraction of that amount is generated within the first minute.

Chlorite is a known precursor of chlorine dioxide when produced through any of various different transformation processes. It would be obvious to substitute chlorite with chemically analogous oxyhalogens derived from the halogen group and consisting of such species as bromine, bromite, hypobromous acid, bromate, iodate, iodine, or their oxy-derivatives. FSA is considered to be a derivative of sulfinic acid, $H_2SO_2$, which is an unstable compound, has a sulfur atom formally in the +2 oxidation state [sulfur(II)], and acts as a strong reductant. FSA has a carbon atom bonded to the sulfur(II) and two amine groups attached to the carbon, as indicated in formula (A).

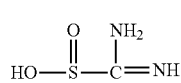
(A)

FSA is diprotic and has $pK_{a1} \leq 2$, $pK_{a2} \sim 9$, so FSA forms in solution a zwitterion and its conjugate base ion (formamidinesulfinite). Thus, in neutral and near-neutral aqueous solution FSA exists primarily as the zwitterion of formula (B).

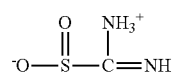
(B)

These are the reactive species with chlorite, particularly in the near-neutral (pH 6-8) regime, and they exclude the route of acidification of chlorite by the FSA parent compound for the generation of chlorine dioxide in the instant claimed invention.

FSA can be purchased commercially as a dry powder starting material from standard chemical supply vendors, or it can be synthesized by oxidations of certain precursors. Thiourea ($SC(NH_2)_2$), for example, is one such precursor that can be readily oxidized to form FSA. Chlorite, chlorine dioxide, bromine, bromite, hypobromous acid, bromate, iodate, iodine, persulfate, and hydrogen peroxide are all oxidants that oxidize thiourea, possibly to form unstable formamidine sulfenyl acid that readily oxidizes further to produce formamidinesulfinic acid (FSA). FSA can also be further oxidized by these oxidants to form formamidinesulfonic acid, that can be oxidized further to produce sulfate. Thus, it would be obvious to substitute FSA with a precursor (an FSA precursor) that could undergo reaction in situ to generate FSA, such as reactions of thiourea or formamidinesulfenyl acid with an oxidant, or formamidinesulfonic acid with a reductant to attain essentially the instant claimed invention. Similarly, it would be obvious to substitute chlorite with chemically analogous oxidants from the group consisting of bromine, bromite, hypobromous acid, bromate, iodate, iodine, persulfate, and hydrogen peroxide to oxidize FSA and produce corresponding biocidal compounds analogous to the production of chlorine dioxide by the chlorite-FSA reaction.

One net effect of the FSA-chlorite reaction is the production of hydrogen ions, whose concentration increase is particularly noticeable in unbuffered aqueous medium. For example, in the reaction of about 1-100 millimolar amounts of chlorite and comparable corresponding amounts of FSA in 100 mL of unbuffered aqueous solution, the pH descends from a value around 8 to a final value around 2.6-3. This pH 3 is sufficiently high to allow safe disposal of the solution by flushing with water in a sink drain. Although it may be customary to use purified (e.g. distilled or deionized) water in laboratories or demonstrations to make these solutions, ordinary potable tap water, similar to the water of a quality found in domestic households or in military field deployments, can also be added to the reaction mixture. The pH of such potable water is typically around 6 or slightly less from dissolved carbon dioxide. However, it is often the practice of many municipalities to maintain a slightly alkaline pH in order to precipitate, hence remove, toxic lead from water that has contacted older plumbing. For the purpose of maintaining a proper pH throughout reaction and disposal, small amounts of an inert, non-toxic buffering salt, sodium dihydrogenphosphate for example, can be added to the FSA-sodium chlorite mixture. In alternative uses with mixed-chemical technologies, the chlorite and FSA are expected to be incorporated with controlled-release soluble materials, effervescent compounds, surfactants or detergents, salts, ions or electrolytes, and pH buffers of sufficient strength to control and maintain constant solution pH in a dissolvable tablet, pellet, capsule, soluble membrane, sachet, or other mixed-chemical or packaging technology. Depending on how long the solution remains in its generation container after its intended purpose has been accomplished, further reactions are possible, in particular, the oxidation of FSA by chlorine dioxide. The time-scale of these ancillary processes is much longer than the time-scale required to produce the relatively copious amounts of chlorine dioxide solutions used for cleaning, decontaminating, disinfecting, and other such applications (vide Jones et al., 1995).

This embodiment of the present invention is not simply a matter of a straightforward oxidation-reduction reaction chemistry; neither is it simply a matter of sodium chlorite acidification. When sodium chlorite is dissolved in an aqueous solution of a mildly acidic buffer (pH 4), chlorine dioxide is not produced. Adding FSA to such a solution induces the rapid formation of chlorine dioxide visually observable and with chlorine dioxide specific indicators in less than 5 seconds. In less than a minute of mixing the sodium chlorite and FSA in aqueous solution, the reaction produces the observable yellow color indicative of chlorine dioxide that is measurable and confirmable using UV/vis spectrophotometry based on the unique, characteristic UV/vis absorbance spectrum of chlorine dioxide. Over the next few minutes this color deepens and bubbles of gas may begin to evolve. It is clear to those familiar in the chemical arts that in multi-step chemical reaction mechanisms such as that for FSA and chlorite, an encounter complex is formed by the reactants prior to steps for their eventual transformation into reaction end-products. Upon forming this complex either (a) FSA transfers an electron to chlorite, or (b) chlorite transfers an O-atom to FSA. In process (a) chlorite forms a free radical transient intermediate such as chlorine monoxide which very rapidly accepts an electron from chlorite, and thereby oxidizes chlorite to chlorine dioxide. In process (b), the transient intermediate hypochlorite ion is formed, and this species oxidizes chlorite to chlorine dioxide. Both processes have identical stoichiometries. These processes continue consuming chlorite and FSA while producing chlorine dioxide, sulfate, and urea. However, even with the plausibility of this postulated reaction mechanism, such knowledge does not pre-figure, anticipate, nor render obvious in any way how the reaction conditions must be formulated and controlled to reliably yield a practical source of chlorine dioxide from this composition and process, as disclosed in this embodiment. As indicated supra, such conditions, if attainable, can only be, and only were, found as reported in the instant patent application.

This type of induced reaction involving only one redox pair is unprecedented. It is not anticipated in the prior art. It is not taught in even advanced textbooks covering induced reactions. Such texts teach, for example, that hydrochloric acid normally used in permanganate titrations interferes in the oxidation of iron(II) by permanganate. The reaction between iron(II) and permanganate creates an intermediate that induces a reaction between permanganate and chloride.

The present invention is simpler than that induced reaction, because a third reagent, the inductor, need not be present. It is simpler than the reaction of the related art (U.S. Pat. No. 7,883,640), because the electron-transfer effector as a third reactant need not be present. Even the venerable and highly important Fenton reaction (iron(II) and hydrogen peroxide) is not comparable to the reaction sequence in this embodiment. For in Fenton chemistry, trace amounts of metal ion oxidation-reduction couples catalyze the oxidation of separate organic substrates (e.g., CH, CHO, and other compounds) by otherwise sluggish-acting hydrogen peroxide. In contrast, this embodiment involves the oxidation of one of the reactants (chlorite) by an intermediate that has been generated by the FSA reductant.

Under the conditions of this embodiment, as shown in the experimental examples above, acidification of chlorite does not contribute appreciably, if at all, to initiating the generation of chlorine dioxide in the instant claimed invention, thus averting the need to transport, handle, store, and dispose of corrosive hazardous acids. It can also be shown using fundamental chemical kinetics calculations that the acidification of sodium chlorite does not contribute appreciably, if at all, to initiating the production of chlorine dioxide (not detectable either visibly or by chlorine dioxide-specific test strips) within the timeframe of the practical generation of chlorine dioxide, particularly within the first one minute of reaction initiation.

For illustrative purposes only, and not intended in any way to limit the various embodiments of the present invention, consider the following calculation comparing the rates of chlorine dioxide production by the acidification-induced disproportionation reaction versus the FSA-chlorite reaction to show that acidification of chlorite does not contribute to the production of chlorine dioxide in the presently claimed invention. A typical set of reaction conditions for practical chlorine dioxide production are ambient atmospheric pressure, temperature=25° C., and various quantities of reagents that can be adjusted to make any desired concentration of aqueous chlorine dioxide solution from 0 to greater than 1000 ppm. As an example of the slowness of production of chlorine dioxide by chlorous acid disproportionation relative to the FSA-chlorite reaction of this embodiment, consider charging a 1.0 L pH 4 buffer solution with 2.0 g $NaClO_2$ and 0.4 g FSA to produce 1.0 g $ClO_2$ for a complete reaction that oxidizes FSA to form as by-products urea and sulfate. These amounts fall well within the range of the reagent quantities specified in Table 1, although the reaction conditions could be scaled or concentrated or adjusted accordingly. For the purposes of this calculation, only the initial Cl(III) concentration and pH are relevant. In the absence of initially added chloride ion and catalyst, the initial consumption ratio (decrease in moles $HClO_2$)/(increase in moles $ClO_2$)=2/1. In these conditions, the rate equation of chlorine dioxide formation by chlorous acid disproportionation is second-order in chlorous acid concentration, and the apparent second-order rate constant for this reaction, $k_2^{dis}$, for disproportionation obtained from the experimental studies of T. Lehtimaa, V. Tarvo, G. Mortha, S. Kuitunen, and T. Vuorinen *Ind. Eng. Chem. Res.* 2008, 47, 5284-5290 (hereby incorporated herein as a reference) is $k_2^{dis}=4.158\times10^{-3}$ $M^{-1}$ $s^{-1}$. From the integrated rate equation, the half-life, $t_{1/2}^{dis}$, of the disproportionation reaction is defined in equation (1):

$$t_{1/2}^{dis} = \frac{1}{k_2^{dis}[Cl(III)]_0} \quad (1)$$

where $[Cl(III)]_0$ is the concentration of sodium chlorite at time, t=0.

The above-described solution is $2.21\times10^{-2}$ M in sodium chlorite and pH=4 phosphate buffer (0.2 M sodium dihydrogen phosphate buffer solution made from 28.0 g of $NaH_2PO_4 \cdot H_2O$, adjusted with 1.7 mL of 1 M $H_2SO_4$, and diluted in water to 1 L final volume). For such a solution composition, $t_{1/2}^{dis}=181$ min for the acidification route to produce chlorine dioxide. Experimentally observed after 1 min is that 2.0 g of $NaClO_2$ reacts with the 0.4 g of FSA and generates sufficient chlorine dioxide to produce a distinct yellow coloration in the solution. In contradistinction, the concentration of chlorine dioxide that would be produced by disproportionation at the end of 1 min in this solution is $1.19\times10^{-8}$ M. Since the maximum Beer-Lambert Law absorptivity coefficient, a, in the $ClO_2$ spectrum is a=1,200 $cm^{-1}M^{-1}$ at 360 nm (an ultra-violet wavelength invisible to the unaided eye), this concentration of chlorine dioxide would be imperceptibly below visual and spectrophotometric detectable limits in a 1 L flask or beaker. Experimental evidence (see Section 2—Tests) confirmed these kinetics calculations.

With the above and other objects in mind, significant features of the present invention are the novelty, ease-of-use, relatively small quantities of starting materials, controlled reaction rates and yields of chlorine dioxide production, safety, and lack of environmental hazards presented by the use of FSA and chlorite without adding acid for the production of chlorine dioxide in relatively dilute aqueous solution. One aspect of the invention is the oxidation of chlorite to chlorine dioxide. Prior to the instant claimed invention presently disclosed, it would have been expected by one of ordinary skill that in producing chlorine dioxide through an oxidation-reduction reaction the chlorite ion would have acted as an oxidant and be reduced to chloride ion and caused FSA to have acted as a reductant and at the least would have undergone sulfur oxidation, perhaps even oxidation of the —CR moiety. Without performing additional experimentation not previously conducted nor disclosed, practitioners of the method and art of oxidation-reduction chemistry would not know how to anticipate the extent to which the individual component C-, N-, and S-atoms of FSA would be oxidized by chlorite. Thus, the prior art would have conditioned those experienced with oxidation-reduction chemistry to anticipate mainly chlorite reduction and sulfur oxidation, and possibly some C-atom and N-atom oxidations (and their respective oxidation products), as well. Therefore, in one plausible scenario, those familiar with the prior art of oxidation-reduction chemistry would have anticipated chlorite reduction to chloride and FSA oxidation to sulfate with scission of the S—C bond leading to formation of urea. This scenario, if it were at all present, would serve only to initiate formation of transient reaction intermediates.

For oxidants such as chlorite and hypochlorite reacting with organic reductants, two generalized mechanistic pathways are postulated in organic chemistry: addition of an oxo-anion and electron transfer, each of which are discussed in standard organic chemistry texts such as "Organic Chemistry 3rd ed," by J. B. Hendrickson et al., which is hereby incorporated herein into this application. Hydrogen bonding with one of the protons on the amino nitrogen would facilitate addition of the oxygen atom of the oxo-anion and provide access to a lone pair of electrons on sulfur(II). In the pathway of electron transfer between the reductant and oxidant, electron transfer would be facilitated by the electron-rich sulfur(II) oxidation state. In either mechanism, the activated complex resulting would be stabilized, and this lowering of the free energy of activation for oxidation of sulfur(II) and reduction of chlorine(III) or chlorine(I) by electron-transfer and/or atom transfer would be expected to make the FSA-chlorite and FSA-hypochlorite reactions rapid. However, knowledge of this plausible mechanism does not provide useful informative or measurable detail regarding the actual kinetics, reaction rates, stoichiometry, reaction yields, the rate of chlorine dioxide production, nor the amounts of starting materials needed for either the FSA-chlorite or FSA-hypochlorite reactions to yield processes capable of generating chlorine dioxide in practical applications, particularly as rapidly generated dilute solutions or on a small-scale or in confined spaces. Such useful information can only be obtained by experimentation that has not heretofore been provided.

The publication Jones, J. B. et al. J. Phys. Chem. 1995, 99, 1523-1529 titled "Oxyhalogen-Sulfur Chemistry: Oligooscillations in the Formamidinesulfinic Acid-Chlorite Reaction" is hereby incorporated herein by reference and should be consulted for some details on the kinetics of the overall FSA-ClO2-reaction. To be certain, however, this publication does not provide insight into the present invention, because it requires the addition of strong acid to the aqueous reaction medium, it has complex side-reactions that consume not produce chlorine dioxide or that induce oligooscillatory patterns, and it does not use buffer to control solution pH in any circumstances. An embodiment of the invention provides a chemical composition and process under certain specific reaction conditions that particularly exclude entirely the addition of strong and or weak acids and the acidification of chlorite to produce chlorine dioxide. In fact, the present claimed invention proceeds via reduction of chlorite, without an electron transfer chemical effector, rapidly produces dilute (1-5 ppm) or concentrated (>5000 ppm) aqueous chlorine dioxide solutions, and sometimes with buffer to control solution pH (as is commonly found in tablets or other related mixed-chemical technologies), that only produce and do not consume chlorine dioxide, and provides a practical and stable source for the generation of chlorine dioxide without demonstrating exotic nonlinear oliogooscillatory behavior. Thus, the instant claimed teaches away from the use of acids and teaches away from the art of Jones et al. (1995), as the addition of acids would undermine the current invention's principles of operation. Other than the description of the occurrence of exotic nonlinear "oligooscillatory" dynamics, Jones et al. (1995) do not indicate any advantages of oligooscillation compared to conventional reaction dynamics for the practical, controlled, power-free generation of chlorine dioxide, or anything else for disinfection, decontamination, or any other similar or related purpose.

DESCRIPTION OF VARIOUS PARTICULAR ASPECTS OF THE INVENTION

1. Apparatus

The preferred medium for generating and dispersing chlorine dioxide in one embodiment of the invention is an aqueous, buffered solution. The buffered reaction can take place using laboratory grade reagents for a classroom lecture demonstration, or by incorporating the reactive and pH buffering and other ingredients (e.g., sulfamic acid/sulfamate, salts, surfactants, etc.) into tablets or any of various mixed chemical technologies such as pellets, capsules, soluble membranes or pouches, and sachets, or by incorporation into various packaging materials used to construct containers or packaging configurations that store reactive components in separate compartments using frangible seals and the like. The solution can be made in an inflexible container such as a beaker or flask. The solution can be made in different types of inflexible container such as a rigid plastic bottle that can accommodate a trigger-spray integrated in a screw-on cap. The solution can be made in a flexible container such as a plastic bag or spray bottle made from flexible plastic pouch material similarly equipped with a screw-on hand-trigger spray device. Such spray or pump devices provide a more directed dispersal of the chlorine dioxide solution as an aerosol or fine mist which is exceedingly useful for spray-and-wipe applications common in sanitizing, disinfecting, and decontaminating common contact surfaces. If the purpose of performing the reaction of the invention is to obtain gas phase chlorine dioxide from the aqueous medium, the phenomenon of off-gassing using a flow of carrier gas, passive evaporation, mechanical agitation, heat, or insolubly high concentrations to allow chlorine dioxide bubbles to escape into the airspace above the solution are among the commonly known effective methods of producing gas-phase chlorine dioxide known to those with familiarity in the art. More forceful dispersal of gaseous chlorine dioxide into the ambient atmosphere can be accomplished using any number of propulsive devices such as high-pressure gas storage cylinders or fan-type blowers added to the selected container to pass dinitrogen or air, for example, through the solution. Entrainment of chlorine dioxide by such a gas flow carries the generated chlorine dioxide out of the solution phase and into the gas phase.

2. Process

Chlorine dioxide-generating compositions adapted for embodiments of the invention can be arranged or packaged in several forms. In one process the chemical reactants are kept apart until chlorine dioxide generation occurs. The solid reactants can be formulated as loose powders or granules, or as pre-measured powders or granules compressed into tablets or encapsulated. Measured amounts of the powders or granules, or a number of tablets are added to one of the apparatus types described above without mixing. A predetermined volume of aqueous solution is added to the apparatus containing the chemical reactants with stirring.

In another embodiment of the present process the solid chemical reactants are mixed together with the exclusion of liquid water. The solid mixture can be contained in a sealed packet(s) intended to be unsealed and emptied into one of the apparatus types. The solid chemical reactants can be contained in frangible envelopes. The solid chemical reactants can be contained behind water-soluble membranes and placed into one of the apparatus types. In another process the pre-mixed solid reactants can be compressed into tablets one or more of which are placed in one of the apparatus types. A predetermined volume of buffer solution is added to the apparatus containing the pre-mixed solid chemical reactants without stirring.

One preferred embodiment of the invention utilizes tap or distilled or deionized water rather than a buffer solution as described above. For example, 2.0 g of solid sodium chlorite and 0.4 g solid FSA pre-mixed as described above is placed in a suitable container and a pre-determined amount of tap or distilled or deionized water is added with stirring to initiate reaction. It is understood, that variations in the precise quantities of reagents used or in their respective relative ratios would produce correspondingly similar results in terms of effectuating production of a chlorine dioxide solution that is most likely aqueous.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A process of generating chlorine dioxide, comprising the steps of: adding formamidinesulfinic acid (FSA) and sodium chlorite to water to form an aqueous solution having a pH of 6-8 and reacting the FSA and the sodium chlorite at the pH of 6-8 to produce chlorine dioxide based on an oxidation-reduction reaction of chlorite and the sulfur-containing compound FSA, wherein the reacting produces chlorine dioxide having a concentration of at least 1 parts per million (ppm) in less than or equal to 30 seconds of adding the FSA and the sodium chlorite to the aqueous solution.

2. The process of claim 1 wherein the amount of chlorite is in excess of the amount of FSA such that the mole ratio of chlorite to FSA is in the range of about {(2-161) mole chlorite}:{1 mol FSA}.

3. The process of claim 2 wherein the amount of sodium chlorite is between 0.7-2.7 g and the amount of FSA is between 0.1-0.65 g, respectively.

4. The process of claim 1 wherein the amount of water is in excess of the amount of chlorite such that the mole ratio of water to chlorite is in the range of about {(27-8658) mole water}:{1 mole chlorite}.

5. The process of claim 4 wherein the volume of water ranges from 15-1200 mL.

6. The process of claim 1 including a pH buffering agent.

7. The process of claim 6 wherein the buffering agent is selected from the group consisting of sodium phosphate, monobasic dehydrate, sodium phosphate dibasic, sulfate, citrate, sulfamate, and meta-bisulfite.

8. The process of claim 1 wherein the amount of sodium chlorite is in excess of the amount of FSA.

9. The process of claim 1 wherein the moles of water are in excess of the moles of sodium chlorite.

10. The process of claim 1 wherein the FSA is produced by the chemical reaction of an FSA precursor to produce FSA.

11. The process of claim 10 wherein FSA precursor is selected from the group consisting of thiourea, formamidinesulfenyl acid, and formamidinesulfonic acid.

12. The process of claim 11 wherein the FSA is produced by chemical reaction of an FSA precursor with an oxidant, said oxidant selected from the group consisting of bromine, bromite, hypobromous acid, bromate, iodate, iodine, persulfate, and hydrogen peroxodisulfate.

13. The process of claim 1 further comprising the step of transporting the generated aqueous chlorine dioxide from the solution phase to the gaseous phase.

14. The process of claim 1 where the FSA and the sodium chlorite are mixed together in the form of loose powders, granules, compressed pellets, or tablets.

15. The process of claim 1 wherein the chlorine dioxide concentration produced is biocidal.

* * * * *